Jan. 22, 1924.  
J. PIRON  
1,481,301  
UNIVERSAL FACEPLATE FOR MACHINE TOOLS  
Filed March 14, 1922
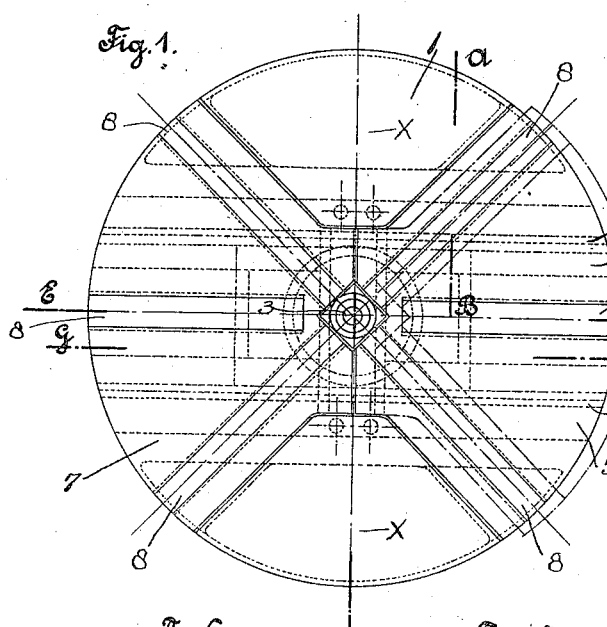
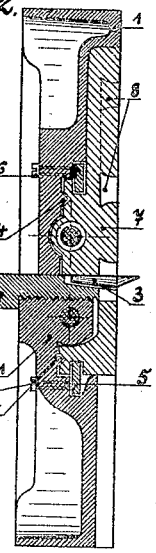
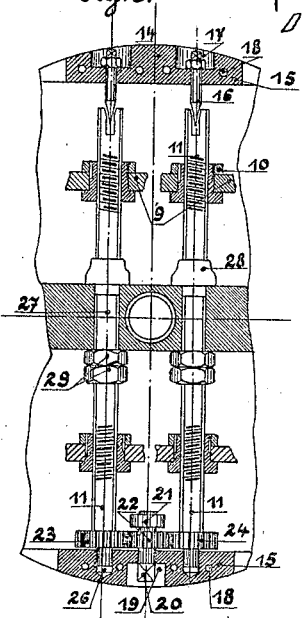
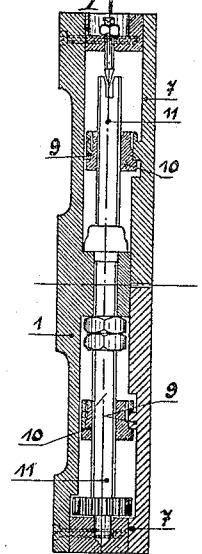
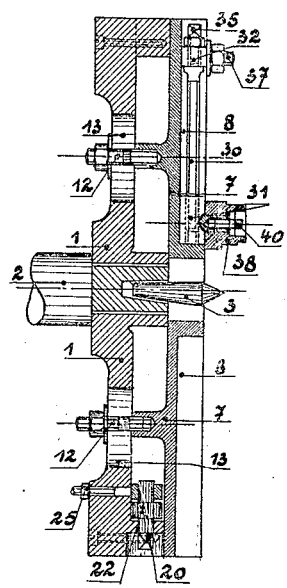
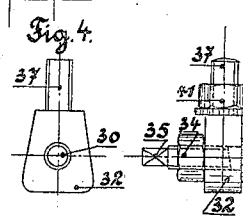
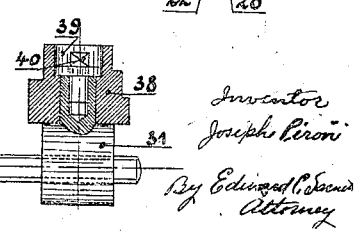

Patented Jan. 22, 1924.

1,481,301

UNITED STATES PATENT OFFICE.

JOSEPH PIRON, OF SCLESSIN, BELGIUM.

UNIVERSAL FACEPLATE FOR MACHINE TOOLS.

Application filed March 14, 1922. Serial No. 543,670.

*To all whom it may concern:*

Be it known that I, JOSEPH PIRON, a subject of the King of the Belgians, residing at 183 Rue Ernest Solvay, Sclessin, Belgium, have invented certain new and useful Improvements in Universal Faceplates for Machine Tools, of which the following is a specification, reference being had therein to the accompanying drawing.

The present invention relates to a universal face-plate which can also be used as a jaw-chuck, and is adapted to be fitted to machine tools such as lathes, milling machines or the like, and in general to all machines utilizing a device of this kind for the fixation of the work or parts to be machined.

The face-plate forming the subject of the invention consists of a plate provided with suitable devices for ensuring the support as well as the adjustment in opposite directions of the plate-sections, by means of the displacement of screw-threaded bushes forming nuts upon rods provided with a suitable screw-thread and preferably receiving a movement of rotation by a toothed wheel mechanism, these movable plate-sections as well as the fixed sections of the plate carrying in suitable grooves jaws which are displaceable at will according to the variable profile of the work to be machined.

The drawings annexed to the present application represent one construction of the improved face-plate.

Figure 1 represents a plan-view of the face-plate, the chucking jaws being removed;

Figure 2 respresents a half-section on the line A—B, Figure 1, and a half-section on the line C—D;

Figure 3 represents an elevation in part section of the parts forming the jaws with which the fixed and movable sections of the plate are provided;

Figure 4 represents the front view of the sliders displaceable in the grooves of the fixed and movable plate sections;

Figure 5 represents a section on the line G—H of Figure 1;

Figure 6 represents a vertical section on the line I—J of Figure 5;

Figure 7 represents a section on the line E—F of Figure 1.

The apparatus comprises a body 1 screwed upon the nose of the spindle 2 of the machine tool. The lathe centre is represented by 3.

Upon this body 1 there can travel along V-shaped ways or ridges 4 and rails or keys 5 secured to the face-plate body 1 by screws such as 6, plate-sections 7 provided with trapezoidal grooves 8. The plate-sections 7, owing to the fitting of the large keys 5, are firmly held on the plate-body 1 while being able to travel longitudinally. These sections 7 also carry lugs 9 fitted with internally screw-threaded bushes 10, through which there pass screw-threaded spindles such as 11, the operation of which will be set out hereafter. The two halves of each spindle 11 have screw-threads of opposite hand and the bushes 10 fitting thereon have right and left hand threads to correspond.

In order to ensure if required a rigid fixation of the movable sections 7 upon the plate-body 1, the movable sections 7 are provided with studs such as 12, the ends of which carry washers and nuts, which by their locking action press upon the rear face of the plate-body 1 and hold the sections 7 fast upon the fixed parts of the plae-body 1. This same plate-body 1 possesses slots 13 intended to allow movement of the studs 12 during the displacement of the movable sections 7 while the nuts and washers of the studs 12 are slackened.

At the periphery of the plate-body 1 there are fixed diametrically two segmental pieces 14 and 15 by means of bolts 18. The segment 14 is provided with cylindrical cavities such as 17 accommodating the controlling head and the locking nut of a centre-pin 16.

The segment 15 is also provided with a cylindrical cavity 19 having an opening suittable to allow the passage of the shaft 20 secured to a pinion 22. This shaft 20 is supported in a lug 21 fixed to the plate-body 1 by means of the bolt and nut 25.

Cavities 26 serve as accommodation for the ends of the shafts 11, whilst the other ends of these screw-threaded shafts 11 are drilled and countersunk so as to receive the conical points of the screws 16 thus forming centre-points.

The screwed shafts 11 carry respectively the pinions 23 and 24 in mesh with the pinion 22 operated by the squared part of the shaft 20. These shafts 11 during their rotation revolve in corresponding bores 27 in the plate-body 1, and their longitudinal displacement is prevented by the use of means such as collars 28 and nuts and locknuts 29.

The screw-threaded bushes 10 act in the manner of nuts, being oppositely screw-threaded in pairs, and upon the simultaneous rotation of the shafts 11 the four parts 10 are directed towards the periphery or are brought towards the centre, according to the direction of rotation communicated by the toothed wheel 22.

It is readily understood that, by reason of the arrangement of the bushes 10 and the lugs 9, integral with the movable sections 7 of the face-plate, these sections participate in the movements of the bushes 10 and therefore separate from or approach one another reciprocally.

Figures 3 and 4 relate to the arrangement and control of the main and secondary chucking jaws located in the grooves in face body 1 and in the grooves 8 in the movable sections 7.

The main jaw consists of a head 38 having stepped faces, with or without ribs or the like. This head can pivot around the upper cylindrical part of the slide 31.

A bolt 40 by means of a washer 39 locks the head 38 upon the plate-section 7 or body 1, see Figures 3 and 7, once the position of the jaw is defined. Moreover, the slide 31 is provided with a screw-threaded hole to receive a screwed rod 30 the rotation of which is controlled by the squared portion 35 at its extremity, and by the further arrangement of a suitable bore in the slide 32, nuts or the like 34 and 33.

The slide 32 which constitutes the secondary jaw is fixed by the pressure upon the edges of the grooves 8, of washers such as 36, held up by nuts such as 41 screwed upon the shanks 37, forming extensions of the slides 32.

It is easily understood that with the bolt 40 somewhat slackened, it is possible, by revolving the screw-threaded rod 30 by means of a suitable handle engaging upon the squared grip 35, to advance or withdraw the head 38 of the jaw, and thus to succeed in giving the jaw the desired position to effect either the suitable clamping of a piece of work or a rotation of the head 38 in order to utilize one or other face of this head as better suited to the desired clamping action.

The working of the apparatus thus described is effected as follows:—

In the first place it is to be remarked that when the nuts and washers, such as 12, are once locked tightly, the sections 7 are rendered fast to the plate-body 1, and the face-plate becomes once more an ordinary face-plate, which can be cleared or not, as desired, of the two sets of jaws.

In the condition of the apparatus, as shown in the drawings, it is seen that the movable sections 7 can each carry three jaws, and the fixed part of the plate-body 1 two jaws, which brings up to eight the total number of jaws with which the plate can be provided.

As has been set forth above, all the jaws being movable, they are readily adjusted according to the dimensions of the part to be machined. A part-turn of the handle upon the squared ends 35 and 40 of the jaws, ensures the complete and rapid fixation of any piece of work, whatever it be, and whether of round, oval, square, rectangular, triangular, or other profile.

A separation of the sections 7, produced by the rotation of the pinion 22, allows of removing the work and substituting another part which if it is of identical profile will be clamped upon the face-plate by a simple movement of the handle upon the square of the toothed wheel 22 and thus ready for machining.

Fig. 1 shows in dotted lines a displaced position of the right hand section 7. It will be understood that since both the right and left hand sections (looking at Fig. 1) are operated simultaneously in opposite directions, the left hand section would occupy a position corresponding to that of the right hand section shown in dotted lines, but in order to avoid complicating the drawings, the displaced position of the left hand section is not indicated.

The advantages of this face-plate, which may be described as universal, are the following:—

(a) It allows of being used for the fixation of any piece of work whatever;

(b) it is adapted to be fitted upon any kind of machine-tool utilizing a face-plate for the fixation of work to be machined;

(c) it can be constructed in any dimensions;

(d) it replaces advantageously the three or four patterns of face-plate in current use on machine-tools.

Having thus described my invention, what I claim is:—

1. A universal face-plate for machine-tools, comprising a body adapted to be secured upon the machine spindle, plate-sections mounted upon said body, parallel screw-threaded spindles mounted in said body, said screw-threaded spindles lying in a plane at right angles to the axis of the machine spindle, nuts engaged upon said screw-threaded spindles, said nuts being operatively connected to said plate-sections, and means for guiding said plate-sections in movement towards or away from the centre.

2. A universal face-plate for machine-tools, comprising a body adapted to be secured upon the machine spindle, plate-sections mounted upon said body, said plate-sections being slidable towards and away from the centre, parallel screw-threaded spindles revolubly mounted in said body, projections from the rear faces of said plate-sections, said projections provided internally with screw-threads and engaging said parallel spindles, toothed pinions upon said parallel spindles, and an operating pinion meshing with said toothed pinions.

3. A universal face-plate, comprising a body, segmental plate-sections mounted in recesses in said body, said sections being slidable along a common diameter to and from the centre, screw-threaded spindles revolubly mounted in said body and parallel to said diameter, screw-threaded means carried by said plate-sections for engaging said spindles, means for locking said sections in position on said body, and means for securing jaws upon said plate-sections and body.

4. A universal face-plate, comprising a body, said body having segmental and diametrically, opposite recesses on one face, segmental plate-sections mounted in said recesses and slidable to and from the centre, screw-threaded spindles revolubly mounted in said body and parallel to said diameter, screw-threaded means carried by said plate-sections for engaging said spindles, means for locking said sections in position on said body, and means for securing jaws upon said plate-sections and body.

5. A universal face-plate, comprising a body, said body having segmental and diametrically opposite recesses on one face, segmental plate-sections mounted in said recesses and slidable to and from the centre, screw-threaded spindles revolubly mounted in said body and parallel to said diameter, projections from the rear of said plate-sections, said projections provided internally with screw-threads and engaging said spindles, toothed pinions upon said spindles towards one end thereof, an operating pinion meshing with said pinions, and means for rotating said pinions in unison.

6. A universal face-plate, comprising a body, said body having segmental and diametrically opposite recesses on one face, segmental plate sections mounted in said recesses and slidable to and from the centre, screw-threaded spindles revolubly mounted in said body and parallel to said diameter, projections from the rear of said plate-sections, said projections provided internally with screw-threads and engaging said spindles, toothed pinions upon said spindles towards one end thereof, an operating pinion meshing with said pinions, studs projecting from the rear faces of said plate sections through parallel slots in said body, and clamping means upon said studs.

7. A universal face-plate, comprising a body, said body having segmental and diametrically opposite recesses on one face, segmental plate-sections mounted in said recesses and slidable to and from the centre, screw-threaded spindles revolubly mounted in said body and parallel to said diameter, projections from the rear of said plate-sections, said projections provided internally with screw-threads and engaging said spindles, toothed pinions upon said spindles towards one end thereof, an operating pinion meshing with said pinions, said body and plate-sections having grooves upon their front faces, trapezoidal sliders fitting in said grooves, means for clamping said sliders in position, jaws fitting in said grooves, revoluble heads upon said jaws, and means for adjusting said jaws along said grooves in relation to said sliders.

In testimony wherof I hereunto affix my signature.

JOSEPH PIRON.

Witnesses:
 FELIX WINAUD,
 SÉVÉRINE HANSENNE.